United States Patent
Cagnon

[15] 3,701,913
[45] Oct. 31, 1972

[54] STRUCTURE FOR CLOSING A MOTOR HOUSING AND FOR SUPPORTING BRUSH ELEMENTS MAKING CONTACT WITH THE ARMATURE THEREOF

[72] Inventor: Eugene C. Cagnon, Detroit, Mich.
[73] Assignee: Ford Motor Company, Dearborn, Mich.
[22] Filed: July 14, 1969
[21] Appl. No.: 841,696

[52] U.S. Cl. .................................310/247, 310/71
[51] Int. Cl. ...........................................H01r 39/38
[58] Field of Search....................310/71, 89, 239, 247

[56] References Cited
UNITED STATES PATENTS

| | | | |
|---|---|---|---|
| 2,275,613 | 3/1942 | Cullin | 310/239 |
| 2,683,826 | 7/1954 | Staak | 310/71 |
| 2,711,491 | 6/1955 | Edmundson et al. | 310/89 |
| 3,244,917 | 4/1966 | Gute | 310/247 |

Primary Examiner—J. D. Miller
Assistant Examiner—L. L. Smith
Attorney—John R. Faulkner et al.

[57] ABSTRACT

A structure both for closing the end of an electric motor housing and for supporting brush elements in electrical contact with an armature of the motor has the following elements. An electrically nonconductive supporting hub which closes the end of the motor is formed which has a surface lying in a plane generally perpendicular to the central axis of the hub. A plurality of brush boxes are also integrally formed which extend upwardly from the hub's surface. The brush boxes define a continuous enclosure for receiving therewithin brushes of electrically conductive material. Electrical connectors are provided for connecting the brushes through the supporting hub to the exterior of the motor. Springs are also provided for each of the brushes to bias the associated brush along its associated brush box and into engagement with the motor armature.

4 Claims, 5 Drawing Figures

PATENTED OCT 31 1972 3,701,913

STRUCTURE FOR CLOSING A MOTOR HOUSING AND FOR SUPPORTING BRUSH ELEMENTS MAKING CONTACT WITH THE ARMATURE THEREOF

BACKGROUND OF THE INVENTION

The prior art teaches many structures for mounting brushes of electrically conductive material in association with an armature of an electrical motor. However, the prior art structures are generally hard to assemble as they are formed from many parts. These parts are generally small and must be preassembled prior to the insertion of the brush holder into the motor housing. Also, the prior art brush holders generally do not form the closure member for the motor housing.

SUMMARY OF THE INVENTION

This invention relates to a structure both for closing the end of a motor housing and for supporting brush elements in electrical contact with an armature of the motor. In greater detail, the structure includes an electrically nonconductive supporting hub, said hub being the principal component of the structure for closing the end of the motor housing. This hub has a surface lying in a plane generally perpendicular to its central axis. Each of a plurality of brush boxes both extend upwardly from the planar surface of the hub and is formed by a bottom wall, a top wall and a pair of side walls which define a passageway, the central axis of the passageway being in a plane perpendicular to the central axis of the supporting hub. The four walls of each brush box, at least in part, define a continuous passageway. A brush of electrically conductive material is slidably received within the enclosed passageway of each brush box. An electrical connector is provided for connecting each of the brushes through the supporting hub to the exterior of the motor. Spring means are also associated with each brush for biasing each brush along its associated brush box and into engagement with the motor armature.

In greater detail, the spring means includes a pair of posts adjacent each of the brush boxes. These posts extend upwardly from the planar surface of the supporting hub and are formed during the molding of the supporting hub and brush boxes. The spring means also includes a wire spring associated with each pair of posts. Each spring has a pair of free ends. The coil of the spring is received on one post while one free end of the spring engages the second post. The other free end of the spring engages the rear portion of its associated brush to apply the biasing force of the spring to the brush to bias the brush into engagement with the motor armature.

In still greater detail, separating means are provided on the supporting hub. The separating means provide for positive separation of the electrical connector means provided to connect each of the brushes to an electrical terminal on the exterior of the supporting hub.

Thus, the supporting hub, brush boxes, spring supporting posts, and separation means are formed. The supporting hub acts as the closure device for the end of the motor while it also supports the brushes of electrically conductive material in association with the armature of the motor when the structure is in its assembled condition.

DESCRIPTION OF THE PREFERRED EMBODIMENT

Figure 1:
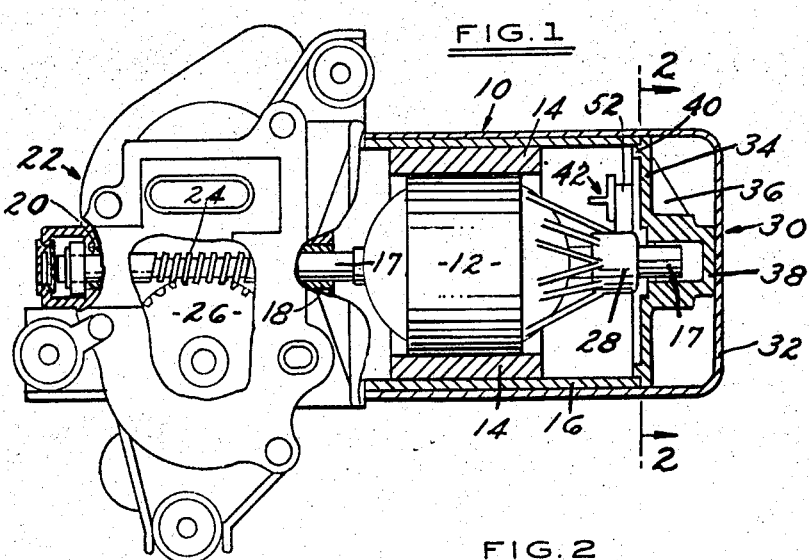
FIG. 1 is a plan view, partly in cross section, of an electric motor employing the structure of this invention for closing the end of the motor housing and for making electrical contact with the armature of the motor.

In FIG. 1, there is shown an electrical motor structure generally designated by the numeral 10. This motor structure is of a type utilized for driving the windshield wiper system of an automobile. The motor includes an armature 12 and pole pieces 14. The pole pieces are secured to a motor housing 16.

The armature 12 is supported by its shaft 17 in a cantilevered fashion between a pair of bearing surfaces 18 and 20, respectively. The bearing surfaces are supported in a gear box structure generally designated by the numeral 22. In the gear box, a gear 24 is formed on the shaft 17 of the armature 12. This gear drivingly engages a second gear 26 which in turn is drivingly connected to the operative portions of the windshield wiper mechanism of a motor vehicle.

A commutator section 28 of the armature 12 is electrically connected to the outside of the motor structure 10, and the motor housing 16 is closed by the structure of this invention, which structure is generally designated by the numeral 30. The construction of the inventive structure will best be appreciated by reference to FIGS. 2, 3 and 4. The structure 30 is held in its assembled position to close the end of the motor housing by means of a metal strap 32 shown in FIG. 1.

Figures 2, 3:
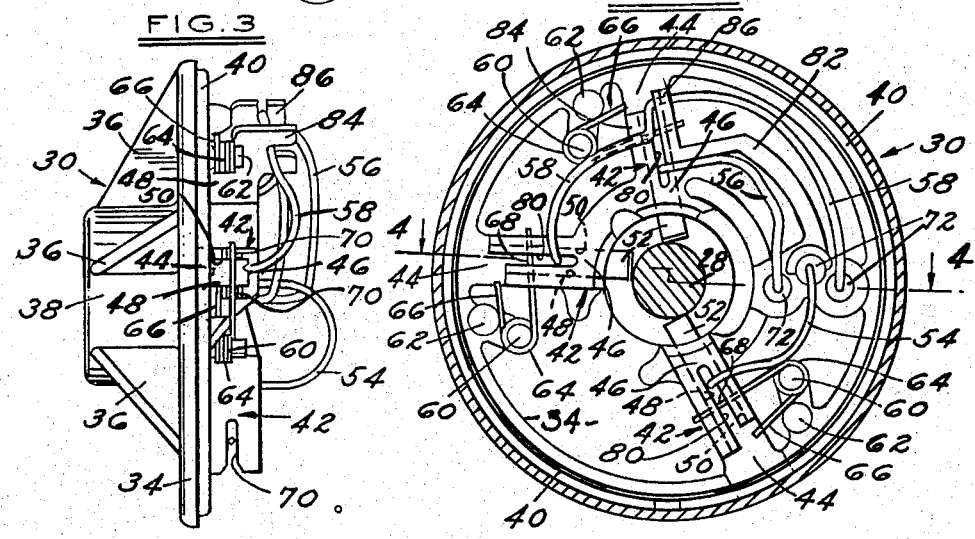
FIG. 2 is a plan view taken along line 2—2 of FIG. 1 showing the details of the structure of this invention.
FIG. 3 is a side elevational view of the structure of FIG. 2.

The principal portion of the structure 30 of this invention is an electrically nonconductive supporting hub 34. The supporting hub has its principal surface lying in a plane perpendicular to the central axis of the hub. As seen in FIGS. 1 and 3, the supporting hub has radially extending members 36 which extend from one portion thereof to support a hollowed out end portion 38 of the structure. The hub 34 receives the end of the armature shaft 17 upon which the commutator section 28 is mounted. The supporting hub 34 also has an upstanding circumferential ridge 40 which, when positioned in conjunction with the motor housing 16, seals the housing when the structure 30 is held in its proper position by the strap 32.

As viewed in FIG. 2, there are three brush boxes, generally designated by the numeral 42, extending upwardly from the planar surface of the supporting hub 34. Each brush box has a bottom wall 44, a top wall 46 and a pair of side walls 48 and 50. The walls of each brush box define an opening and the central axis of these defined openings are all in a plane perpendicular to the central axis of the supporting hub passing through the hollowed out end portion 38 of the structure 30. The front portion of the four walls of each brush box faces the central axis of the supporting hub and defines a continuous enclosure for the interior of the volume at least in the forward end of the volume.

A brush of electrically conductive material, designated generally by the numeral 52, is mounted within each of the brush boxes 42. The brushes 52 are connected to the exterior of the supporting hub 34 by electrical leads respectively designated by the numerals 54, 56 and 58. The leads have different designations because of the difference in length of the lead necessary to bring the point of electrical connection of different ones of the brushes 52 to the proper position in the supporting hub. The shortest lead has the lowest numerical designation. The manner of accomplishing the electrical connection through the supporting hub will be described in greater detail in a subsequent portion of this specification.

A pair of upstanding posts 60 and 62 are formed adjacent to each of the brush boxes 42 both at the rear end thereof and slightly offset therefrom as best seen in FIG. 2. The posts are formed in the plastic molding operation during the formation of the supporting hub 34 and the brush boxes. The posts extend generally perpendicularly upward from the planar surface of supporting hub as viewed in FIG. 2.

Figure 4:
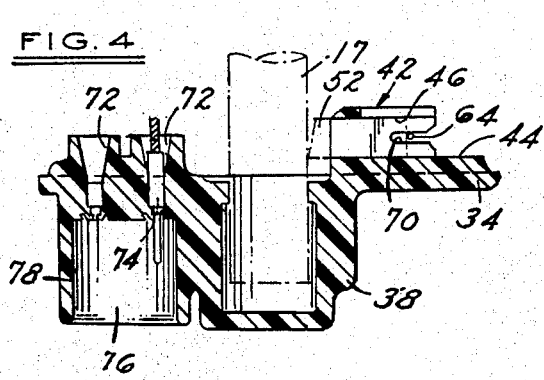
FIG. 4 is a cross sectional view taken along the line 4—4 of FIG. 2 to show, in greater detail, the manner in which electrical connection is made through the structure to the exterior thereof, the figure being both reduced in size from the scale of and rotated 180° in position from that of FIG. 2.
Figure 5:
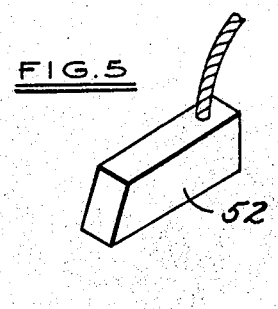
FIG. 5 is a schematic view of one of the brush elements utilized in the structure.

A wound, coil spring 64 is received on each of the posts 60. One free end 66 of each spring engages the second post 62 to keep the spring in tension. Another free end 68 of the spring is received in a pair of slots 70 formed in the side walls 48 and 50 of each brush box 42. These slots 70 are best seen in FIGS. 3 and 4. Since the spring is under tension, the free end portion 68 thereof biases its associated brush 52 into engagement with the commutator section 28 of the armature 12 thereby making electrical contact with the motor structure 10.

The manner in which the brushes 52 are connected by their various length leads to the outside of the supporting hub 34 is best understood by reference to FIGS. 2 and 4. In FIG. 4, there is seen two of three openings 72 through the supporting hub to the exterior thereof. Each of the openings contains an electrical terminal 74 (one shown in FIG. 4) which extends through the opening into a cavity 76 formed by a raised portion 78 of the supporting hub 34. The lead 54 from one of the brushes 52 passes upwardly out of a slot 80 formed in the top wall 46 of its associated brush box 42 and is thereafter directed to the central one of the openings 72 and its associated electrical terminal 74. The lead 56 from a second one of the brushes 52 passes upwardly out of the slot formed in the top wall of its associated brush box and then along a partition wall 82, best seen in FIG. 2, to its associated opening and electrical terminal. The partition wall 82 is formed in the same molding operation as the brush boxes and supporting hub. As best understood by reference to FIGS. 2 and 3, the lead 58 from the third brush 52 also passes upwardly out of the slot formed in the associated brush box, thence through the bifurcations of an upstanding element 84 formed as a portion of the side wall 48 of the uppermost brush box 42 (see FIG. 3), thence through the bifurcations of another upstanding element 86 formed as part of the partition wall 82, and thence along the other side of the partition wall 82 to its associated opening and electric terminal. In such a manner, all three of the brushes 52 are connected to the exterior of the electric motor.

In such a manner, the structure of this invention may be utilized both for closing the end of an electric motor and for making contact with the armature of the motor.

I claim:

1. A structure both for closing the end of an electric motor housing and for supporting electrical brushes in contact with an armature of the motor which comprises:

an electrically nonconductive supporting hub formed to a configuration for closing the end of the motor housing and having a surface lying in a plane generally perpendicular to the central axis of said hub;

a plurality of brush holders formed integrally with said supporting hub, each of said brush holders comprising a bottom wall, a top wall and two side walls which define a passageway, the central axis of said passageway being in a plane perpendicular to said central axis of said supporting hub, said four walls of each of said brush boxes, at least in part; defining a hollow enclosure;

a brush of electrically conductive material slidably received within said hollow enclosure of each of said brush boxes;

electrical connector means for providing connecting terminations from each of said brushes through said supporting hub to the exterior of the motor; and spring means associated with each of said brushes for biasing each of said brushes along its associated brush box and into engagement with the motor armature.

2. The structure as defined in claim 1 wherein said spring means for biasing said brushes against the armature of the motor comprise: a pair of posts adjacent each of said brush boxes and extending upwardly from said planar surface of said supporting hub in the same direction as said brush boxes, and a wire spring associated with each of said pair of posts, said spring being wound with two extending free ends, the coil portion of said spring overlying one post of each of said pair of posts with one of said free ends of the said spring engaging said second post as the second of said free ends of said extends into a pair of slots formed in the side walls of said associated brush box to thereby engage the rear portion of the brush contained within said associated brush box to bias said brush into engagement with the armature, said posts being formed integrally with the formation of said supporting hub and said brush boxes.

3. The structure as defined in claim 2 wherein each of said electrical connector means comprises: a lead of conductive material joined to an associated one of said brushes, and a terminal supported in an opening formed in said supporting hub, said electrical lead being connected directly to said terminal, said upper wall of each associated brush box having a slot therein for reception of the lead connecting said terminal and said brush so that as said associated brush is moved along its associated brush box, said lead will move therewith.

4. The structure defined in claim 3 wherein: separating means are provided which extend upwardly from said planar surface of said supporting hub and integrally supported thereby for positioning each of said leads from said plurality of brushes to said plurality of terminals therefore so that the leads are separated from one another and will not come into contact with one another.

* * * * *